United States Patent
Turvey

(10) Patent No.: US 10,516,357 B2
(45) Date of Patent: Dec. 24, 2019

(54) GENERATOR AND METHOD FOR CONTROLLING A GENERATOR

(71) Applicant: ROLLS-ROYCE plc, London (GB)

(72) Inventor: Simon Turvey, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/543,195

(22) PCT Filed: Jan. 13, 2016

(86) PCT No.: PCT/GB2016/050072
§ 371 (c)(1),
(2) Date: Jul. 12, 2017

(87) PCT Pub. No.: WO2016/113558
PCT Pub. Date: Jul. 21, 2016

(65) Prior Publication Data
US 2017/0373624 A1     Dec. 28, 2017

(30) Foreign Application Priority Data

Jan. 13, 2015 (GB) .................................. 1500499.7

(51) Int. Cl.
*H02P 9/00* (2006.01)
*H02K 19/20* (2006.01)

(52) U.S. Cl.
CPC .............. *H02P 9/00* (2013.01); *H02K 19/20* (2013.01)

(58) Field of Classification Search
CPC .... H02P 25/08; H02P 9/00; H02P 9/40; H02P 25/03; B60L 15/025
(Continued)

(56) References Cited

U.S. PATENT DOCUMENTS 4,625,160 A * 11/1986 Hucker .................... H02K 3/16
                                                         310/115
4,965,463 A * 10/1990 Maruyama ................ H02J 3/42
                                                         307/84
(Continued)

OTHER PUBLICATIONS

Mese et al., "Optimal Excitation of a High Speed Switched Reluctance Generator," Applied Power Electronics Conference and Exposition, Fifteenth Annual IEEE, Feb. 6, 2000, vol. 1, pp. 362-368.
(Continued)

*Primary Examiner* — Julio C. Gonzalez
(74) *Attorney, Agent, or Firm* — Oliff PLC

(57) ABSTRACT

A switched reluctance generator and devices and methods for its control are concerned with generators and controls which can operate in an aerospace environment. The generator may have: a rotor having rotor poles; a stator having stator poles; and a controller. Either the rotor or stator poles each have windings to which current can be supplied to energise the poles and from which current can be drawn to a load; and the controller is arranged to: periodically excite each of the windings in turn to a pre-determined level of current; measure the current generated in each winding; cease the excitation when the current generated in each winding exceeds the excitation current; and direct the generated current in each winding to the load. The generator may thereby avoid the need to determine the position of the rotor poles relative to the stator poles to provide the commutation of the generator.

20 Claims, 15 Drawing Sheets

(58) Field of Classification Search
USPC .................................................. 322/44, 59
See application file for complete search history.

(56) References Cited

U.S. PATENT DOCUMENTS

| | | | | |
|---|---|---|---|---|
| 5,404,091 | A * | 4/1995 | Radun | H02P 9/40 318/696 |
| 5,936,386 | A * | 8/1999 | Heglund | H02P 25/092 318/701 |
| 6,586,903 | B2 | 7/2003 | Moriarty | |
| 7,071,659 | B1 * | 7/2006 | Torrey | H02P 9/40 318/254.1 |
| 7,394,229 | B2 * | 7/2008 | Lim | H02P 9/00 318/701 |
| 2003/0020436 | A1 * | 1/2003 | Coles | H02P 9/40 322/44 |
| 2003/0107342 | A1 | 6/2003 | Gallegos-Lopez | |
| 2005/0093521 | A1 * | 5/2005 | Nishimura | H02K 3/28 322/32 |
| 2008/0042611 | A1 | 2/2008 | Tandon | |
| 2014/0340056 | A1 | 11/2014 | Chen | |

OTHER PUBLICATIONS

Lipták et al., "Equivalent Circuit of Switched Reluctance Generator Based on DC Series Generator," Journal of Electrical Engineering, 2008, vol. 59, No. 1, pp. 23-28.
Miki et al., "A Sensorless Drive Method for Switched Reluctance Motor Based on Gradient of Phase Inductance," IEEE Sixth Annual Conference on Electrical Machines and Systems, ICEMS 2003, Nov. 9-11, 2003, pp. 615-618.
Jul. 16, 2015 Search and Examination Report issued in British Patent Application No. 1500499.7.
May 3, 2016 International Search Report issued in International Patent Application No. PCT/GB2016/050072.
May 3, 2016 Written Opinion of the International Searching Authoirty issued in International Patent Application No. PCT/GB2016/050072.

* cited by examiner

GENERATOR AND METHOD FOR CONTROLLING A GENERATOR

FIELD OF THE INVENTION

The present invention relates to a switched reluctance generator and devices and methods for the control of such a generator. It is particularly but not exclusively concerned with a switched reluctance generator and control for such which can operate in an aerospace environment.

BACKGROUND OF THE INVENTION

The present dedicated generator for large civil aerospace engines generally takes the form of a "Constant Current" PMA (permanent magnet alternator). The machine is essentially a 3 phase permanent magnet generator having multiple output sets that provide independent power to the EEC channels. On older designs two independent 3 phase outputs were required but on more modern designs 4 independent 3 phase outputs are required.

FIG. 1 shows, in schematic form, the elements of such a generator. The generator 102 is mechanically connected to a gearbox pad 101, and electrically connected via looms 103 to an EEC regulator 104 which supplies the power to the downstream loads.

The "Constant Current" nomenclature is derived from the feet that the short circuit current from the machine is by design set at a value determined by its own self inductance. This value is such that, the machine can safely be run continuously into a short circuit without overheating and the regulation scheme relies on this to rectify and pulse width modulate (PWM) this fixed current to the load in such a way as to maintain the desired output voltage. The current chosen must be adequate to power the load at the lowest operating speed. This configuration is shown in FIG. 2.

This Constant Current PMA has a number of advantages:
1. Safe short circuit current in the event of a fault
2. Simple regulation algorithm
3. Power can be made available over a wide speed range (6%-120%)
4. Semiconductor Switches are run over a restricted range of current and voltage
5. System is self starting, no external power required However, the Constant Currant PMA also suffers from a number of disadvantages
1. The losses in the generator are fixed independent of the actual load.
2. The maximum power must be fixed during system design; it is not possible to transiently increase the output power. This means that any margin, however transient has to be designed in from day one increasing risk, size and weight.
3. The machine is never more than 50% efficient.
4. The machine has an undesirable high open circuit failure mode.
5. These machines are reaching the limit of manufacturability.

Therefore, whilst the present dedicated generator scheme, based on a PMA, is robust and well proven, the need for increased power to the EEC, driven by more complex engine control schemes, that in themselves are driven by the desire for improved engine efficiency, mean that the size and weight of the PMA has been rising whilst the reliability has been falling due to reducing thermal margins driven by gearbox temperature and internal PMA losses.

Although efforts are being made to investigate improvements to the PMA to overcome some of the manufacturing issues and to mitigate thermal issues, the basic power limitation issues will remain.

An object of the present invention is to provide an alternative generator that may reduce the size and weight of the dedicated power source whilst raising the efficiency such that temperature margins are restored and so improving reliability.

One such generator is the Switched Reluctance Generator (SRG) which is derived from the Switched Reluctance Motor (SRM). These machine types are well reported in the literature and have been trialed for a number of engine based applications due to a range of inherent advantages. However, they also present a number of technical challenges.

In particular, the control of such generators is typically highly complex and reliant on a shaft encoder and microprocessor or Digital Signal Processor (DSP) to provide timing data to control the current flows in the machine windings. This type of control is not acceptable in a dedicated power application where the reliability of the overall system must be higher than that which can be achieved if the system is reliant on a resolver and complex logic for its operation.

A switched reluctance (SR) motor or generator consists of a number of windings designed to create flux paths within the machine that change in length, or reluctance, as the machine moves or rotates.

The magnetic concept of "reluctance" represents the difficulty that flux has in completing a complete circuit. Most energy in the machine is stored in these reluctance elements and it is the change in reluctance (effectively length) of these flux paths that drives the energy conversion process from mechanical to electrical within a SR machine. It may be noted the flux paths within the machine are almost completely independent of each other and this gives a suitably controlled SR machine inherent fault tolerance.

For the purposes of this description it will be assumed that the energized windings are on the outside of the machine and that this is the "stator" whilst the inner element is supported by bearings and is the "rotor". It will also be assumed that the flux will pass radially across the machine. All the above are in practice variables within the machine design which are readily changed by the skilled person and the present invention is not intended to be limited to this configuration.

FIG. 3 shows a typical arrangement for a simple Switched Reluctance (SR) machine. It shows the two inner magnetic paths of the rotor 105 which, when in alignment, complete the flux path for the stater coils 106. In the example shown in FIG. 3, there are three "coil pairs" denoted by the numbers 1-6. Each pair of coils is positioned opposite each other in the stator 107.

As a motor the SRM can be understood quite simply as a machine driven by magnetic attraction, so a current flow is a created in one of the coil pairs that creates a magnetic field that attracts the nearest rotor element until it pulls it into line. Once this pole pair is aligned the next pair of coils in the required direction of rotation is energized and the rotor moves to the next position and so the process proceeds. For example, from the position shown in FIG. 3 energizing coils 1 and 4 would attract the rotor poles and drive the rotor counter-clockwise whilst energizing coils 2 and 5 would attract the rotor in a clockwise direction.

In practice the timing and current control of the coil energization is critical to achieving the best performance from an SRM and controller boards based on DSPs and accurate position sensors attached to the rotor shaft are therefore used to optimize the drive function. Much work has been done, again using DSP based solutions, to achieve sensorless control of SRMs but difficulties in operating over the full speed range still limit their usefulness except for fall back control needed if the sensors fail.

FIG. 4 shows the electrical equivalent of the SRM in FIG. 3 for counter-clockwise rotation. As can be seen, each pair of coils 106 are connected in series between the positive and negative supply tines. A pair of switches 103 are used to energise each pair of coils in accordance with the switching phase sequence shown at the top of the Figure. A current path when the switches are open and the phase is in freewheeling or generating mode is provided by diodes 108.

SR machines are noted for their ruggedness and ease of construction, both ideal features in an aerospace application. However they are often not selected for these applications due to three key design issues.

First SR machines are inherently less efficient than a permanent magnet machine. However, as discussed above, in the aerospace application, the permanent magnet solution can never be more than 50% efficient because of the nature of the impedance limited power transfer they employ so an SR machine operating at >85% efficiency can easily out compete the PMA on this key weakness.

Second the SR family of machines is critically dependent on the bearing type used and the concentricity of the bearing to the stator and rotor pole tips. In embodiments of the present invention we propose, there is a significant efficiency margin, and so slightly increased air gaps at the pole tips can be incorporated to overcome this problem by maintaining proportionately better balance of forces as the pole tips come into alignment.

The final problem often cited against the SR generator is the need for complex control and sensor based solutions that inherently reduce the system reliability below acceptable levels for a dedicated power source. The generators and methods of operation of the present invention aim to address this problem.

It is an objective of this invention to provide a generator and a method of controlling a generator which avoid the need to have, whether by absolute measurement, or computed by indirect means, the relative position of the rotor to the stator of the SRG. It is a further object of the present invention to use the actual instantaneous generation of power from the machine to effect control.

SUMMARY OF THE INVENTION

At its broadest a first aspect of the present invention provide a method of controlling a switched reluctance generator in a self-commutating fashion.

A first aspect of the present invention provides a method of controlling a switched reluctance generator, the generator including: a rotor having a plurality of rotor poles; and a stator having a plurality of stator poles, wherein: either said plurality of rotor poles or said plurality of stator poles each have windings to which current can be supplied to energise said poles and from which current can be drawn to a load, the method including the steps of: periodically exciting each of the windings in turn to a pre-dedermined level of current; measuring the current generated in each winding; ceasing the excitation when the current generated in each winding exceeds the excitation current; and directing the generated current in each winding to the load.

As indicated, the windings may be on either the stator or rotor poles. Preferably the windings are on the stator poles as this removes the need to arrange for connections to the windings which are maintained whilst the rotor is rotating.

The other poles may be permanent magnets, or may have their own windings which are permanently energised when the generator is running.

The switched reluctance generator has variable rather than fixed flux. With this variable flux, peak flux need only be applied under transient conditions during very low speed operation or under peak load conditions and this means that the losses in the magnetic circuit can be much lower during normal operation than the fixed lux permanent magnet solutions. Variable flux also provides the ability to tap into the extra power of the machine at higher speeds without raising the output voltage.

In the switched reluctance generation of this aspect, once a winding is generating, the field current is naturally increased during the transit of the opposite pole (for a generator with stator windings, the rotor pole) over the winding (for a generator with stator windings, on the stator pole). This produces positive feedback making the average output current greater than that established by the field excitation. The commencement of current flow may then be used as a robust timing indicator for the pole transition.

Using this feedback to control the energising of the windings means that the generator can operate without additional complex timing functions or sensor input. It can also improve the efficiency of the generator by potentially ensuring that windings are not energised whilst a winding is delivering power to the load, which would result in higher losses.

Therefore, each of said windings may be excited at a time when said windings are not generating current, or are generating current which is below a pre-determined level.

The excitation may also be controlled to ensure that the peak excitation current never exceeds that which can be usefully used by the machine either by active limiting or by delaying the application of excitation after the cessation of current delivery to the load by a pre-determined period.

Each winding may be is controlled and energised independently of the other windings. When each winding is controlled completely independently, this potentially provides very high integrity by redundancy, as well as potentially providing greater efficiency under normal running conditions than is possible with a PMA. Thus winding independence is important for aerospace applications where a high degree of fault tolerance is required. In certain embodiments the windings on the poles may also be connected in series pairs or quads to improve performance.

In certain embodiments, the generator outputs a multiple phase output to the load and the multiple phases are supplied from different ones of said windings.

Such arrangements allow for independent current control in each phase dependent on the desired output voltage.

The method may include the further steps of: storing the timing of the ceasing of excitation of at least one winding in one cycle; and using said stored timings to determine the timing of exciting one or more of said windings in a subsequent cycle.

Where the generator is supplying a multiple phase output, it is possible to simply treat each phase individually with a common demand input based on the state of the output voltage. However, in certain situations it may be advantageous to use the timing data from the "last cycle" to produce an average timing value for the generator as a whole. This may permit improvements in power losses in excitation and a reduction in the peak output current of each phases, resulting in a controlled reduction in the average current flow in the load.

In certain embodiments, the method may include the further steps of, for each winding: storing the timing of the ceasing of excitation of the winding in one cycle; and using said stored timing to determine the timing of exciting said winding in the subsequent cycle.

By suppressing the delivery of excess current by timing its application relative to the self-commutation, further reductions in the power loss can be achieved.

The method may further include a step of regulating the power output from the generator by adjusting the timing of exciting said windings compared to the stored timings.

The method may involve the further step of regulating the output from the generator to the load by adjusting either the amplitude or the timing of the excitation of the windings. This may allow the same self-commutation feature to also be used to modulate the output current. This modulation may be carried out in response to a "demand" input, for example from a controller monitoring the load, or a user.

In particular the method may include regulating the output such that there is a minimum current flowing through each winding. This minimum current flow can set the flux as a function of the average air gap between the rotor and stator whilst the rotor speed sets the EMF The method may ensure that the energy consumed in the flux generation process of the generator does not exceed the energy delivered by the generator at any given speed. This may be achieved, for example, by centrally monitoring the output voltage or by averaging the input and output current flows and adjusting the demand to match the available power.

As the switched reluctance generator requires a current flow to energise the windings to generate flux to create a voltage, it is theoretically unable to start generation from an unpowered situation. Although, in real terms, it is nearly impossible to completely de-magnetise the machine so there will normally be some residual flux which can be used in the start up process, the generator may have further provision to enable or guarantee start-up.

In certain embodiments, the generator may include small permanent magnets in the flux path which will give sufficient voltage to begin the process of energising the windings.

The generator may further include an energy storage device and the method may then include the further steps of storing energy whilst the generator is not operational and using said stored energy to energise the windings when the generator is started. The small amount of voltage generated either from the residual flux or from the permanent magnets can then be stored to provide enough energy to establish the necessary flux to start the generation process. Alternatively, the energy to establish the necessary flux may be provided from an external power source.

The method of this aspect may include some, all or none of the above described optional features in any combination.

Although the method of this aspect may be used in combination with the switched reluctance generator of the second aspect below, it need not be and can be used in conjunction with other switched reluctance generators.

At its broadest, a second aspect of the present invention provides a switched reluctance generator which is self-commutating.

A second aspect of the present invention provides a switched reluctance generator, the generator including; a rotor having a plurality of rotor poles; a stator having a plurality of stator poles; and a controller, wherein: either said plurality of rotor poles or said plurality of stator poles each have windings to which current can be supplied to energise said poles and from which current can be drawn to a load; and the controller is arranged to: periodically excite each of the windings in turn to a predetermined level of current; measure the current generated in each winding; cease the excitation when the current generated in each winding exceeds the excitation current; and direct the generated current in each winding to the load.

The level of excitation delivered to a winding may be determined to match the machine to the load.

As indicated, the windings may be on either the stator or rotor poles. Preferably the windings are on the stator poles as this removes the need to arrange for connections to the windings which are maintained whilst the rotor is rotating.

The other poles may be permanent magnets, or may have their own windings which are permanently energised when the generator is running.

The switched reluctance generator has variable rather than fixed flux. With this variable flux, peak flux need only be applied under transient conditions during very low speed operation or under peak load conditions and this means that the losses in the magnetic circuit can be much lower during normal operation than the fixed flux permanent magnet solutions. Variable flux also provides the ability to tap into the extra power of the machine at higher speeds without raising the output voltage.

In the switched reluctance generator of this aspect, once a winding is generating, the excitation current is naturally increased during the transit of the opposite pole (for a generator with stator windings, the rotor pole) over the winding (for a generator with stator windings, on the stator pole). This produces positive feedback making the average output current greater than that established by the initial excitation set by the controller. The commencement of current flow to load may then be used as a robust timing indicator for the pole transition.

Using this feedback to control the energising of the windings means that the generator can operate without additional complex timing functions or sensor input. It can also improve the efficiency of the generator by potentially ensuring that windings are not energised whilst a winding is delivering power to the load, which would result in higher losses.

Therefore, the controller may be arranged to excite each of said windings at a time when said windings are not generating current, or are generating current which is below a pre-determined level.

The controller may also be configured to ensure that the peak excitation current never exceeds that which can be usefully used by the machine either by active limiting or by delaying the application of excitation after the cessation of current delivery to the load by a pre-determined period.

The controller may be arranged to control each winding independently of the other windings. When each winding is controlled completely independently, this potentially provides very high integrity by redundancy, as well as potentially providing greater efficiency under normal running conditions than is possible with a PMA. Thus winding independence is important for aerospace applications where a high degree of fault tolerance is required. In certain embodiments the windings on the poles may also be connected in series pairs or quads to improve performance.

In certain embodiments, the generator outputs a multiple phase output to the load and the controller is arranged to supply said multiple phases from different ones of said windings.

Such arrangements allow for independent current control in each phase dependent on the desired output voltage.

The control of each phase may be independent and single or multiple phases may drive individual loads connected to the generator.

The generator may further comprise one or more comparators to determine when the current generated in each winding exceeds said predetermined threshold.

The controller may be further arranged to: store the timing of the ceasing of exciting at least one winding in one cycle; and use said stored timings to determine the timing of exciting one or more of said windings ia subsequent cycle.

Where the generator is supplying a multiple phase output, it is possible to simply treat each phase individually with a common demand input based on the state of the output voltage. However, in certain situations it may be advantageous to use the timing data from the "last cycle" to produce an average timing value for the generator as a whole. This may permit improvements in power losses in excitation and a reduction in the peak output current of each phase, resulting in a controlled reduction in the average current flow in the load.

In certain embodiments, the controller is further arranged to, for each winding: store the timing of exciting the winding in one cycle; and use said stored timing to determine the timing of exciting said winding in the subsequent cycle.

By suppressing the delivery of excess current by timing its application relative to the self-commutation, further reductions in the power loss can be achieved.

The controller may be arranged to regulate the power output from the generator by adjusting the timing of exciting said windings compared to the stored timings.

The controller may be further arranged to regulate the output from the generator to the load by modulating the output current from the windings by adjusting either the amplitude or the timing of the excitation of the windings. This may allow the same self-commutation feature of the controller to also be used to modulate the output current. This modulation may be carried out in response to a "demand" input, for example from a controller monitoring the load, or a user.

In particular the controller may be arranged to regulate the output such that there is a minimum current flowing through each winding. This minimum current flow can set the flux as a function of the average air gap between the rotor and stator whilst the rotor speed sets the electromotive force (EMF).

The controller may be further arranged to ensure that the energy consumed in the flux generation process of the generator does not exceed the energy delivered by the generator at any given speed. This may be achieved, for example, by centrally monitoring the output voltage or by averaging the input and output current flows and adjusting the demand to match the available power.

As the switched reluctance generator requires a current flow to energise the windings to generate flux to create a voltage, it is theoretically unable to start generation from an unpowered situation. Although, in real terms, it is nearly impossible to completely de-magnetise the machine so there will normally be some residual flux which can be used in the start up process, the generator may have further provision to enable or guarantee start-up.

In certain embodiments, the generator may include small permanent magnets in the flux path which will give sufficient voltage to begin the process of energising the windings.

The generator may further include an energy storage device which is arranged to store energy which is used to energise the windings when the generator is started. The small amount of voltage generated either from the residual flux or from the permanent magnets can then be stored to provide enough energy to establish the necessary flux to start the generation process. Alternatively, the energy to establish the necessary flux may be provided from an external power source.

The generator of this aspect is particularly suitable for use in an aerospace setting, for example in accordance with the third aspect described below. However, the generator can be used in many other settings as well.

The generator of this aspect may include some, all or none of the above described optional features in any combination.

A third aspect of the present invention provides an engine having a dedicated generator which is a switched reluctance generator according to the above first aspect, including some, all or none of the optional features of that aspect.

An embodiment of this aspect provides an aerospace dedicated generator and regulator that is both fault-tolerant and simple. This generator does not rely on complex sensors or microprocessor technology and is therefore more robust and certifiable than systems described in the prior art.

Switched reluctance generators are known for their ruggedness and ease of construction which make them highly suited to an aerospace application. The switched reluctance generator of the above second aspect is even more suited for this application as it can improve on the efficiency and reliability of known switched reluctance generators.

Furthermore, the switched reluctance generator of the above second aspect can reduce or remove the need for complex control and sensor based solutions to control the operation of the generator. Such control and sensor requirements generally reduce the reliability of a switched reluctance generator below the acceptable levels for a dedicated power source in an aerospace application. By obviating the need for such controls and sensors, the switched reluctance generator of the above first aspect can achieve a reliability and certifiabliity which is acceptable for an aerospace application.

In an aerospace implementation, the variable flux of the generator can enable high integrity actuation loads needed to improve engine efficiency from a dedicated source.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
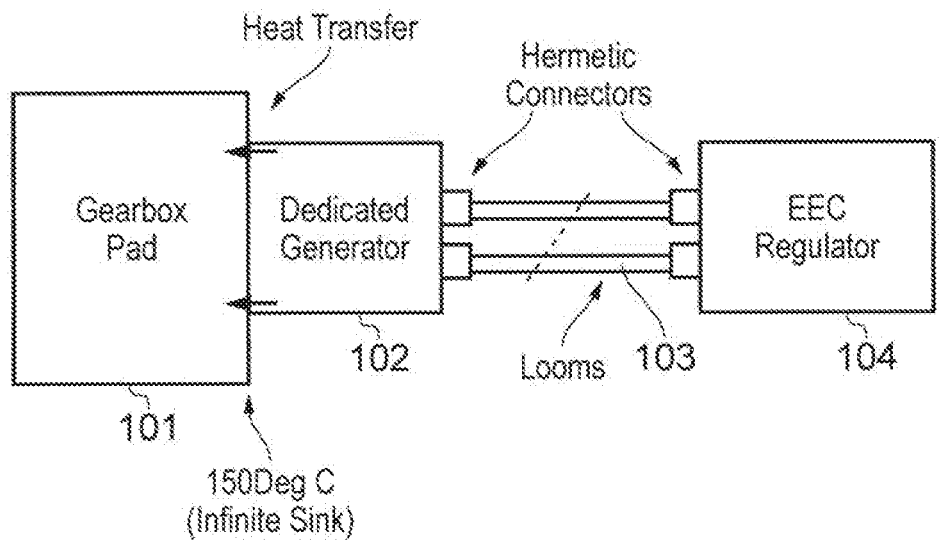
FIG. 1 shows an overview of the functional elements of a dedicated power generator in an aerospace implementation and has already been described.
Figure 2:
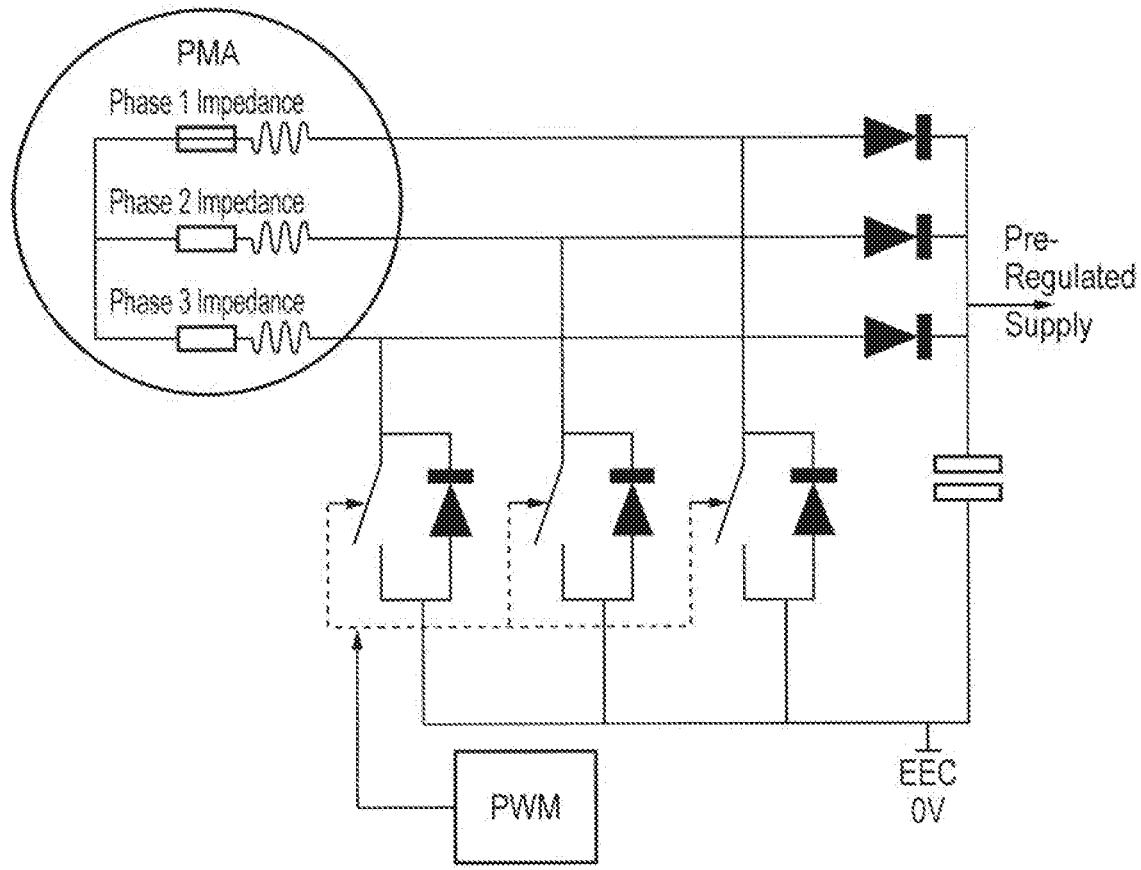
FIG. 2 shows a known regulator scheme for a PMA generator and has already been described.
Figure 3:
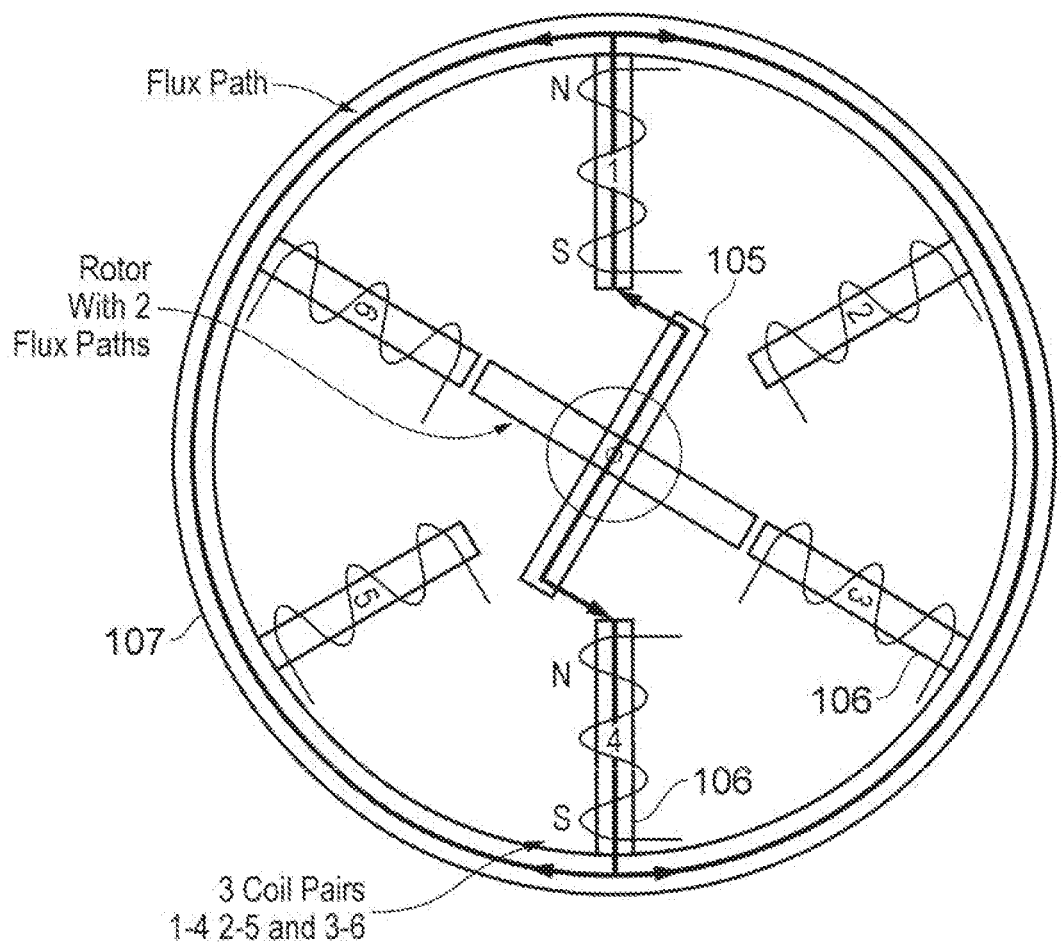
FIG. 3 shows a switched reluctance arrangement with three sets of stator windings and two rotor flux paths and has already been described.
Figure 4:
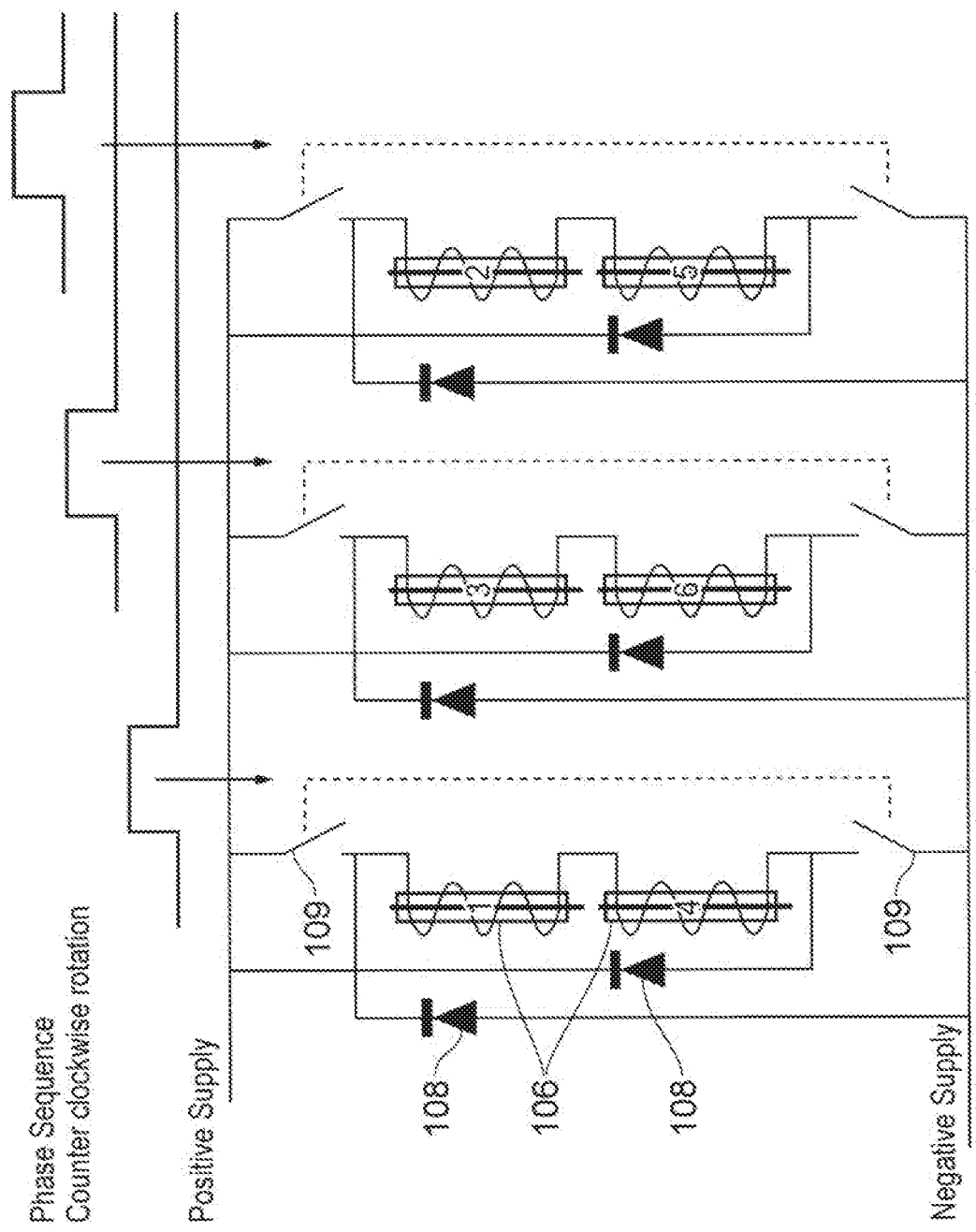
FIG. 4 shows the electrical equivalent circuits for the switched reluctance machine of FIG. 3 and has already been described.
Figure 5:
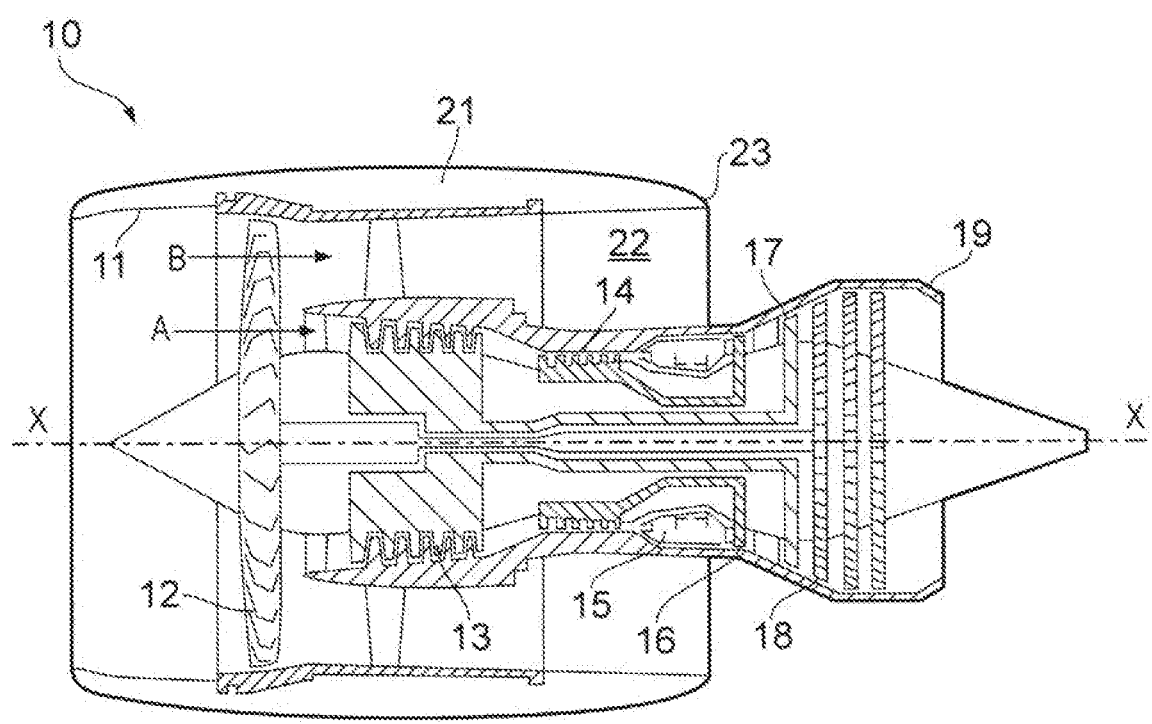
FIG. 5 shows a ducted fan gas turbine engine to which a generator according to an embodiment of the invention may be attached.

With reference to FIG. 5, a ducted fan gas turbine engine according to an embodiment of the present invention is generally indicated at 10 and has a principal and rotational axis X-X, The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Attached to one of those shafts is an off-take for a gearbox (not shown). The gearbox drives various ancillary components, including a dedicated alternator, which may be a generator according to a further embodiment of the present invention, for example as described further below.

Whilst the operation of the SRM is relatively easy to grasp at a simplistic level the operation of the SRG can at first seem more difficult. References in published works often relate to the complexity of driving the coils to achieve the desired output and like the SRM, sensor-based DSP solutions are often mandated.

What often appears to be missing from the discussion of the SRG is a simple practical model on which to build understanding. The paper "Equivalent Circuit of Switched Reluctance Generator Based on DC Series Generator" published in the Journal of Electrical Engineering Vol 59 No 1 2008 23-28 by Martin Lipták, Valéria Hrabovcová and Pavol Rafajdus of University of ilina, whilst still founded on the use of DSPs, provides a significant insight into the basic operation of the machine type will be summarised below.

The basic concept is that the machine can be seen as an analogue of the series wound brushed DC generator, elements of which have been in use since the inception of electrical generation.

The key feature of the series wound brushed DC generator for the purpose of understanding the SRG is that the output current flow occurs in the same direction and in the same magnetic elements needed to increase the magnetic field of the machine in a positive direction. Thus as the load current on the machine increase so does the ability of the machine to deliver more power, so a positive feedback mechanism is achieved.

Therefore in the SRG application, if we can establish a current flow in the coils, the current flow in the coils will increase in those same coils, providing a load is present. The presence and understanding of what the load represents also need to be expanded on since it is assumed that once a current flow has been established in the necessary coils the voltage generated across the coils will be a function of the flux created and the rate of change of that flux.

The greater the reluctance, the lower the flux for a given current flow in the coils; so as the rotor 105 moves the reluctance reduces and the voltage rises to a peak. If this peak is higher than the voltage across the output, a current will flow and a load current can be drawn. Clearly it is important to maintain the correct relationship between load or output voltage and coil current. Too much current delivered to the coils and the output voltage could collapse to very little and not enough voltage will be generated to power the control electronics and switches.

One practical point is that all of the above relies on a current flow in the coils to generate flux to create voltage. However, without a flux to start the machine there is no way to create the current flow so the machine will never start, in practice it is nearly impossible to de-magnetise a machine completely so there will almost certainly be some residual flux to create a voltage. However, to ensure this is the case it is common to introduce small permanent magnets in the flux path to give enough voltage to begin the process, even if this small amount of voltage needs to be boosted and stored to provide enough energy to establish the necessary flux to start the generation process.

The basic principle that can be extracted from the discussion of SRGs above is that if all the windings in the machine are excited at a low level of current there will come a point as the rotor pole moves over the stator pole where the EMF in the stator winding will be of the correct polarity to deliver current to the load. As the current is delivered to the load it will naturally exceed the value set by the PWM controller for that phase and this will cause the phase drive to switch off leaving the steering diodes to steer the winding output to the load.

Figure 6:
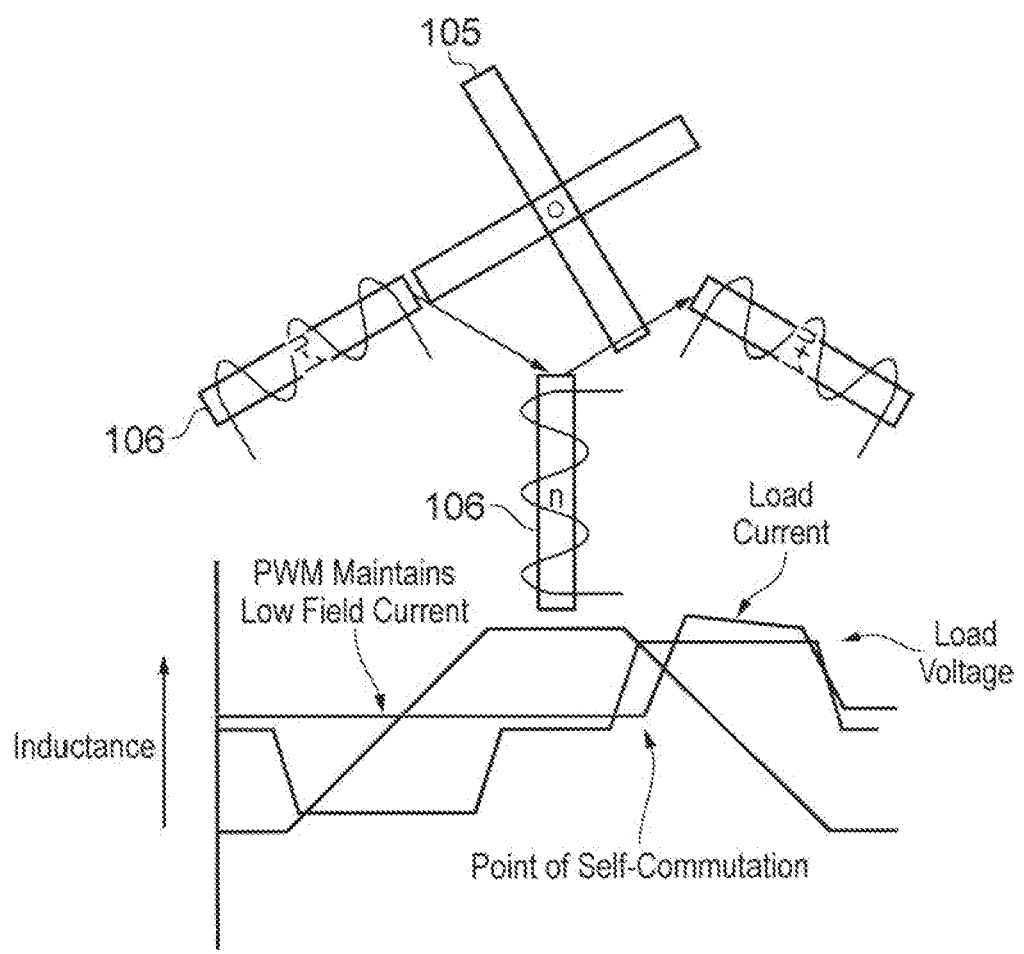
FIG. 6 is a super-position of the movement of the rotor with the various electrical characteristics of the winding of coil n shown.

FIG. 6 shows schematically the linkage between the rotor 105 spinning counter-clockwise and the inductance in the coil of winding pole n. As the rotor pole leaves pole n−1 the inductance of winding n begins to rise and an EMF is generated in winding n that opposes the flow of current in the desired direction. At this point in the cycle the PWM controller would be actively maintaining the desired current flow. This current is maintained as the pole and rotor cross each other and the inductance begins to fall at which point the voltage across the winding reverses polarity and, if a load is present, current begins to flow that causes an increase in flux and power generation as the inductance of pole n again returns to its minimum condition.

For the purposes of discussion, of the detailed embodiments below only a single phase of the SRG will be detailed but in practice the SRG can have any number of phases and a single or multiple analogue control loops would be used to achieve final closed loop voltage control. The skilled person would readily appreciate how the embodiments detailed below could be extended in this manner.

Figure 14:
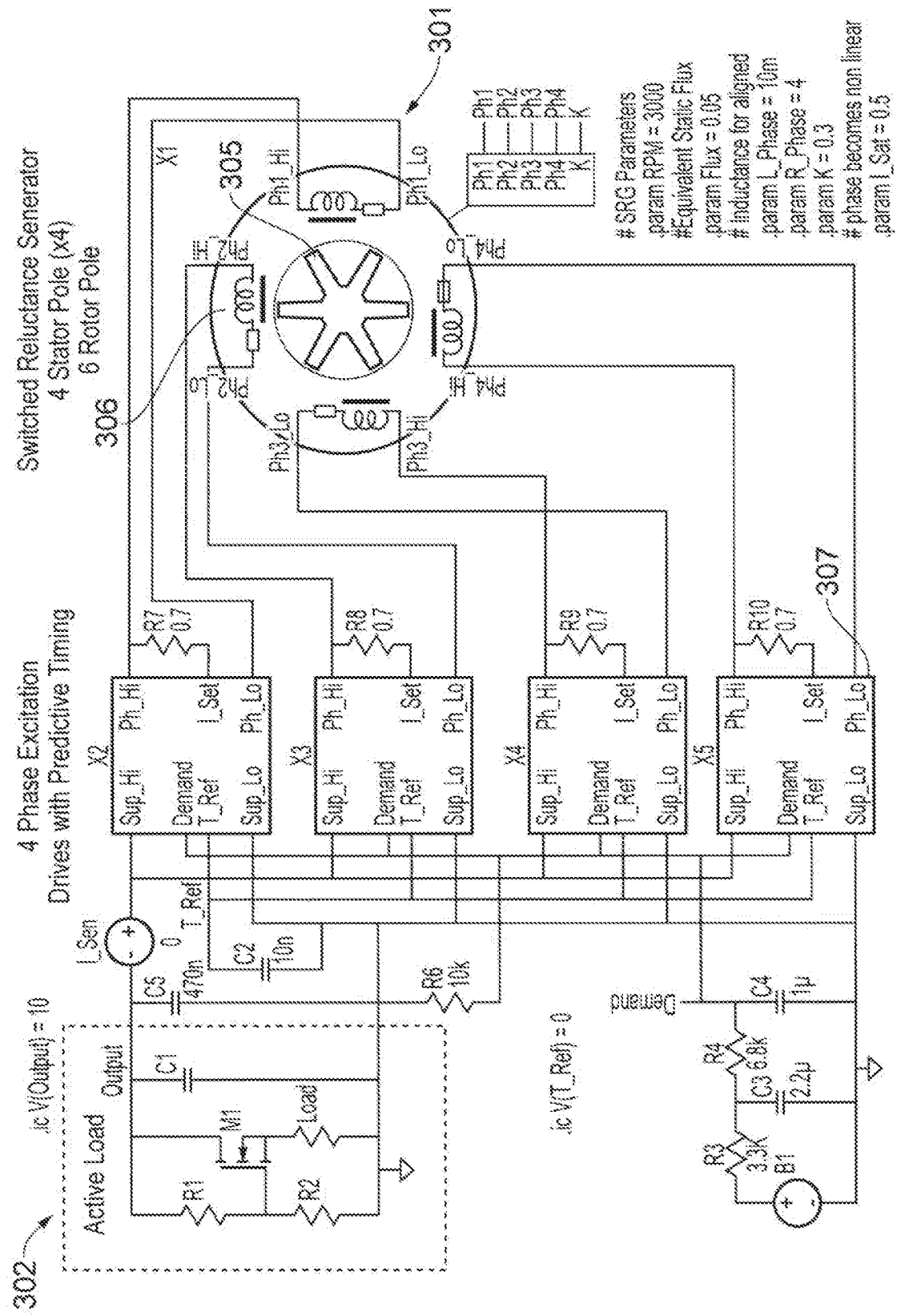
FIG. 14 is a schematic circuit diagram of a multi-phase drive controller including average last cycle timing control.

The embodiment shown in FIG. 14 moves towards this final system although final voltage loop closure is not completed. Also the excitation currents in the embodiment shown in FIG. 14 are generated using power FETs operating in linear mode, whereas in practice it may be preferable that the FETs are driven in PWM switch mode (the simpler linear solution appears to be viable, in which case use of the more complex PWM solution may not be necessary).

The basic idea behind the generators of the embodiments described below is to base a switched reluctance generator regulator on a little used feature of the SRG that it behaves like a series wound DC generator. This means that once a phase is generating the field current is naturally increased during the rotor pole transit over the stator pole winding. This produces positive feedback making the average output current greater than that established by the field excitation and the commencement of current flow can be used as a robust timing indicator for the rotor pole transition.

This means that the SRG can be used as a generator without complex timing functions and that each stator winding can be controlled completely independently resulting in the possibility of very high integrity by redundancy as well as providing greater efficiency under normal running conditions than is possible with a PMA Embodiments of the invention can vary but will generally consist of a uni-polar switch mode current drive per phase of the machine. Such a drive might feature one or two active switches but would follow the typical arrangement for an SRM motor drive.

The phase drives can be linked together by a common demand that will set the minimum current flow in the phase. This minimum current flow can set the flux as a function of the average air gap whilst the rotor speed sets the resulting EMF. It is important to ensure that the energy consumed in the flux generation process at no point exceeds the energy delivered by the machine at any given speed. This problem might occur if the output voltage rises to high for the combination of flux and speed to accommodate so current does not flow to output or if the losses in the current drive exceed the power available from the machine.

How this control is managed will depend on implementation; it may be done centrally by monitoring rise and fall of output voltage or it may be more advantageous to average the input and output current flows and reduce the demand to match the available power.

Figure 7:
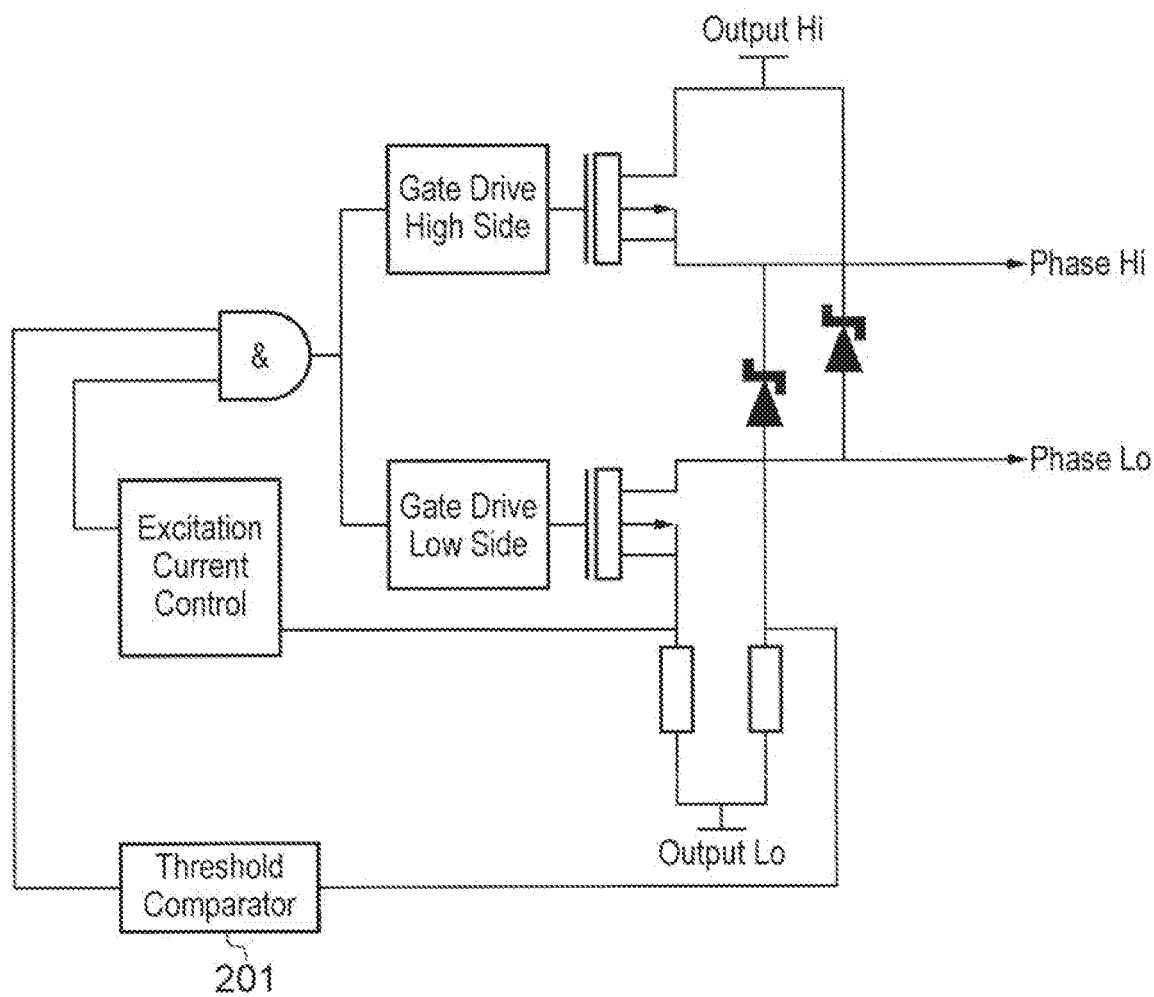
FIG. 7 is a functional block diagram for a drive controller for a single phase of a generator according to an embodiment of the present invention.

FIG. 7 shows a functional block diagram of a very basic phase drive according to an embodiment of the present invention which incorporates a threshold comparator 201 that provides the "self commutation" of the generator. Without this threshold comparator 201, the excitation drive is active whilst the SRG is delivering power and losses are higher than is necessary.

Figure 8:
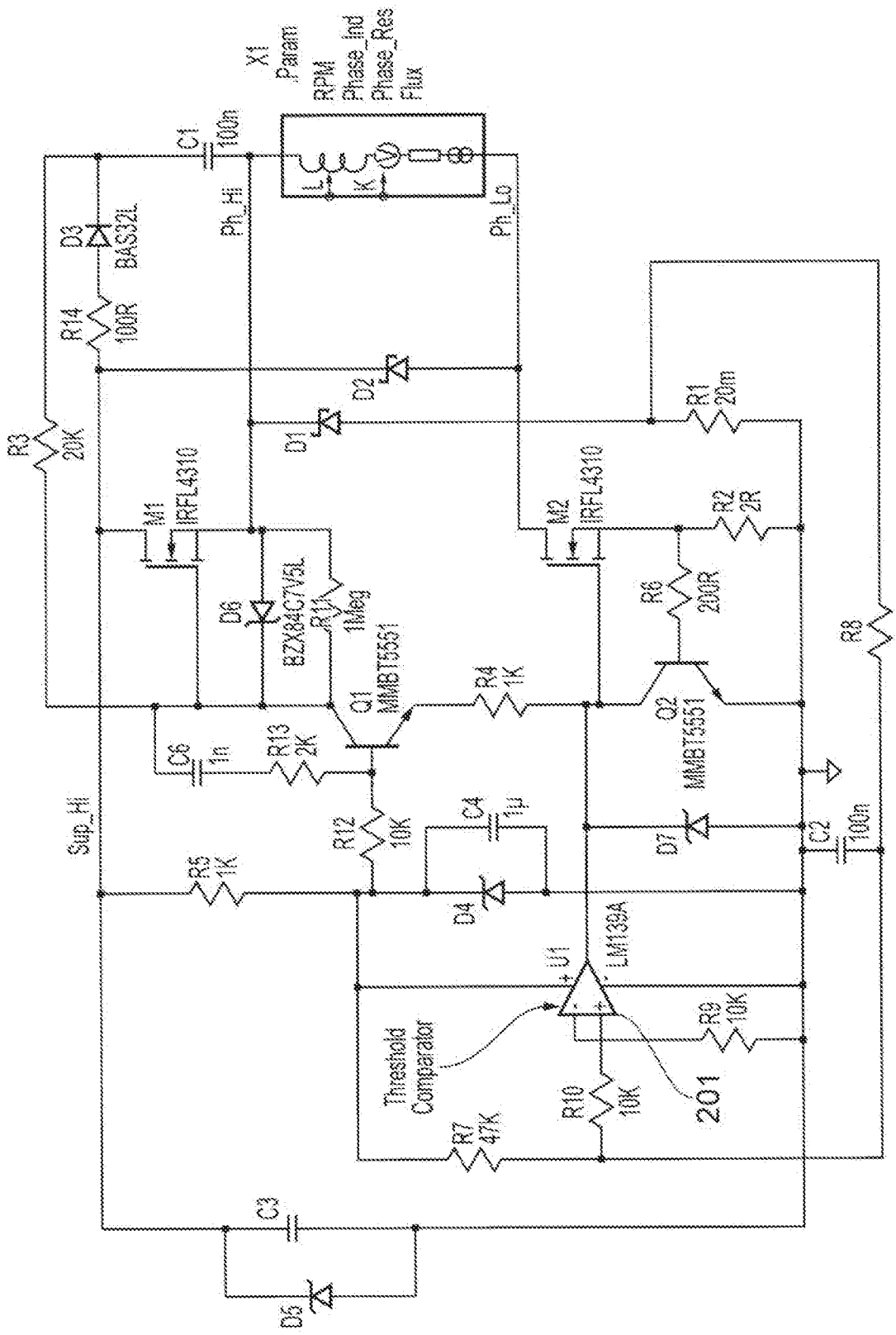
FIG. 8 is a schematic electrical circuit diagram of the drive controller of FIG. 7.

FIG. 8 shows a schematic circuit diagram of the phase drive of FIG. 7. By simulating the design shown in FIG. 8 with and without the threshold comparator 201 active the effect of this component can be seen.

Figure 9:
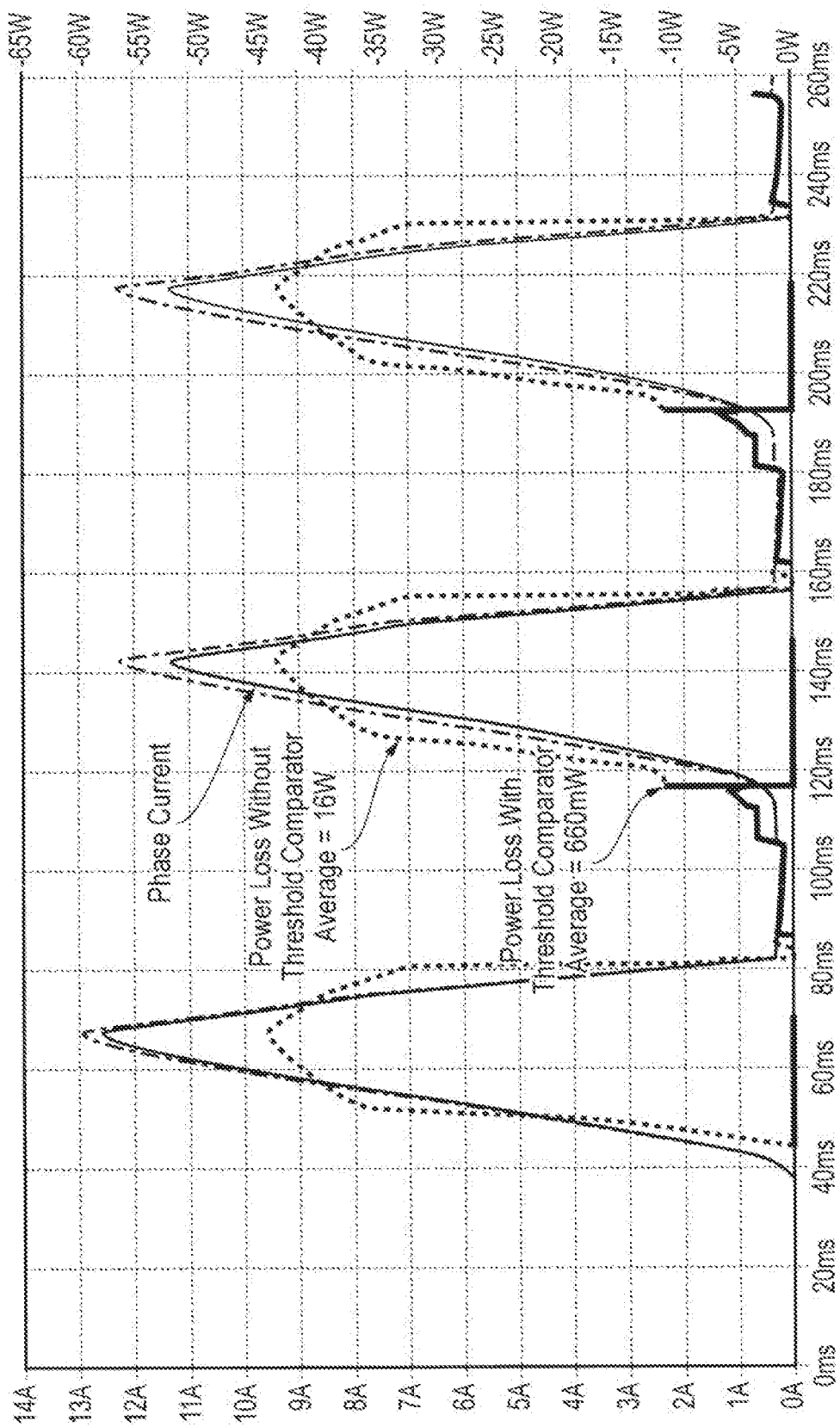
FIG. 9 shows the results of a simulation of the drive controller of FIGS. 7 and 8 with and without the threshold comparator operating.

FIG. 9 shows the results; although the generated phase current is very similar in each case the power lost in the excitation is much higher, peaking at 45 W if the "self commutation" feature is not active.

The basic self commutating design of this embodiment can be refined by further suppressing the delivery of excess current by timing its application relative to the "self commutation". This refinement results in a further reduction in loss power from 660 mW to 200 mW.

The ability to perform predictive timing of excitation current, based on the "self commutation" feature opens up the possibility for further refinement namely the possibility of output current control by excitation timing.

The essence of the timing control is that it uses the "self commutation" timing from the previous SRG phase output cycle to predict the optimal point at which to apply the excitation voltage for the next phase power output cycle. If it is used in this manner it simply minimizes the power lost in the drive stage. In the present embodiment this timing data is generated by capacitors and stored from cycle to cycle on capacitors but it would be possible for this to be in digital form if the reliability of such digital circuits was considered adequate.

Figure 10:
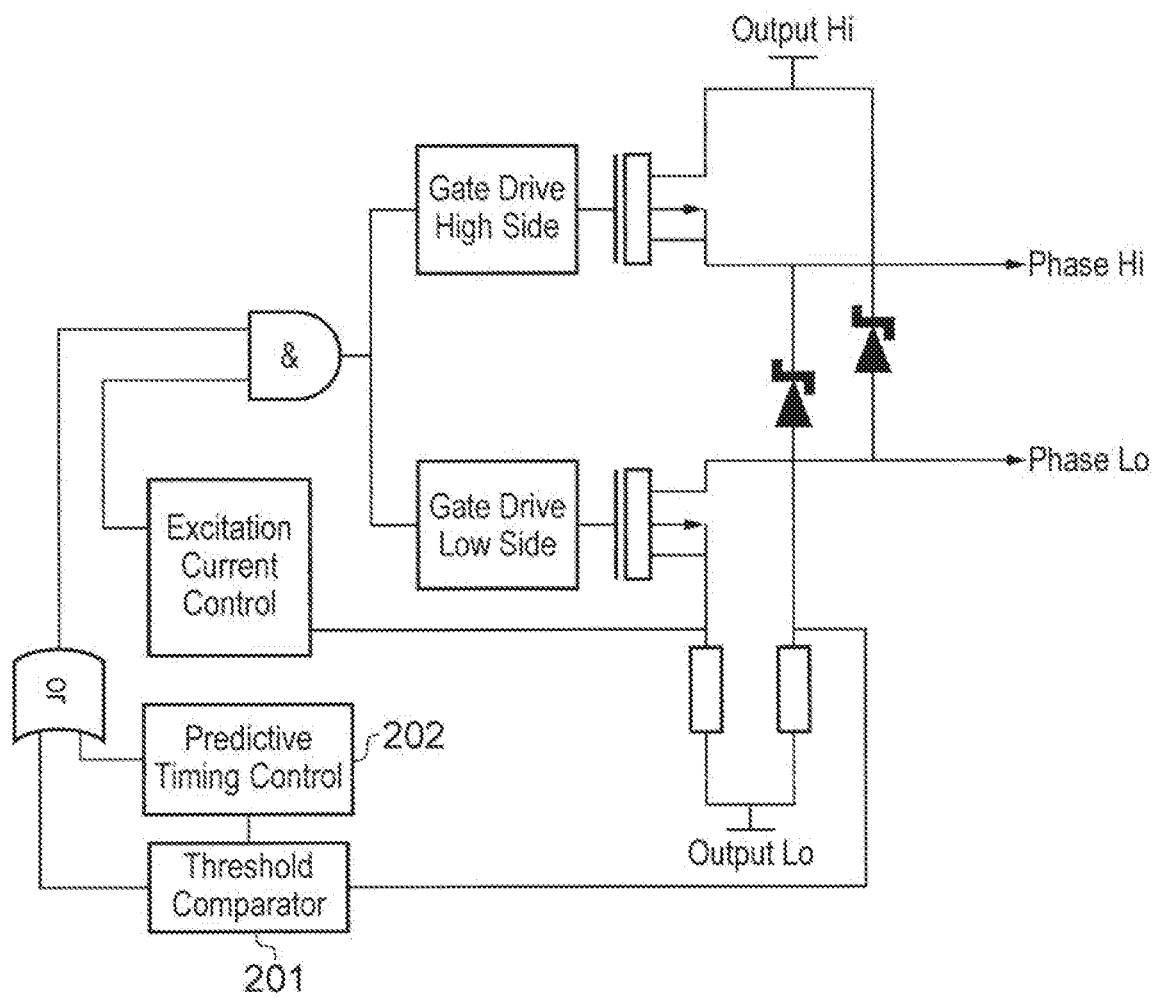
FIG. 10 is a functional block diagram for a drive controller for a single phase of a generator according to a further embodiment of the present invention.
Figure 11:
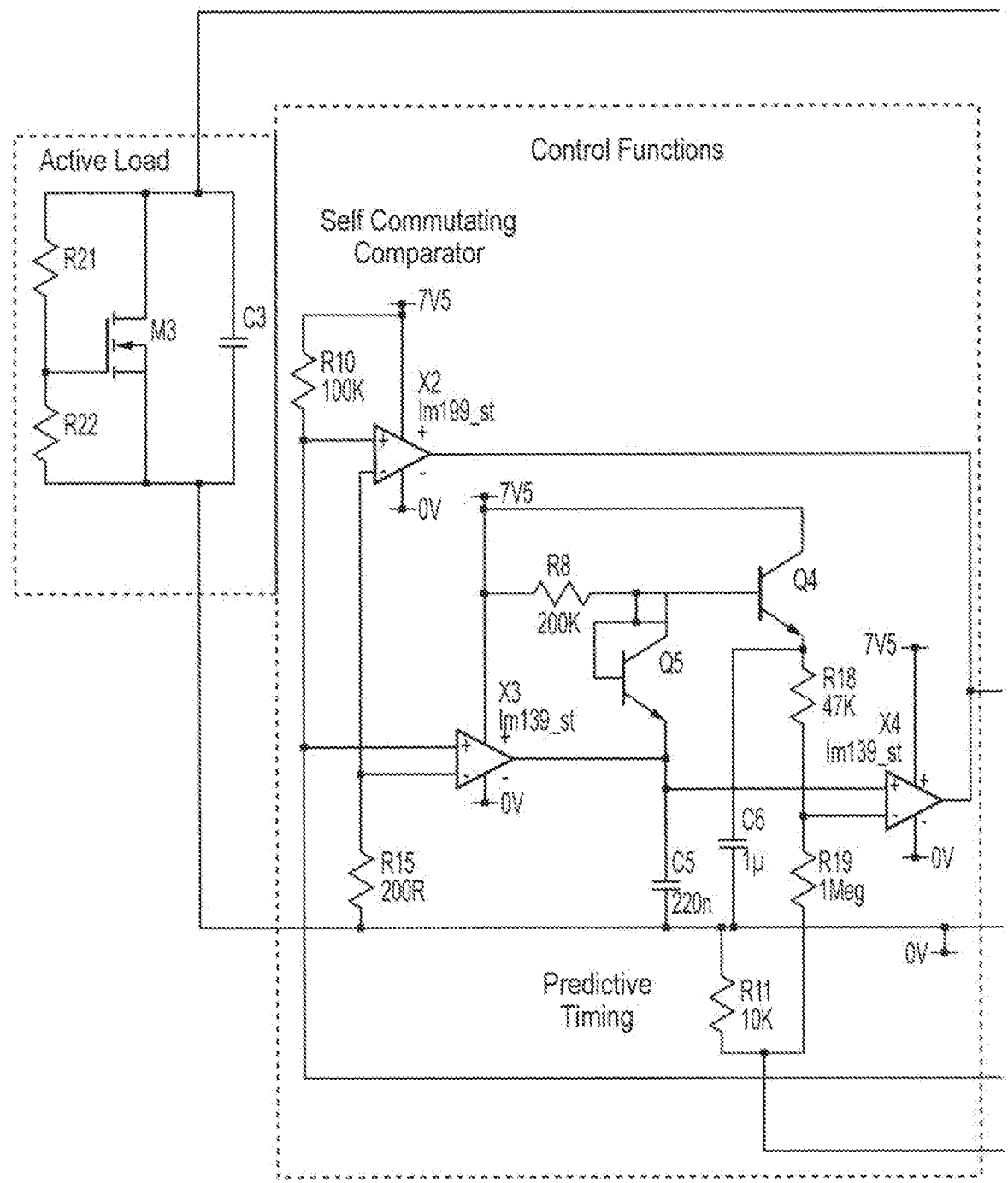
FIG. 11 is a schematic electrical circuit diagram of the drive controller of FIG. 10.
Figure 11:
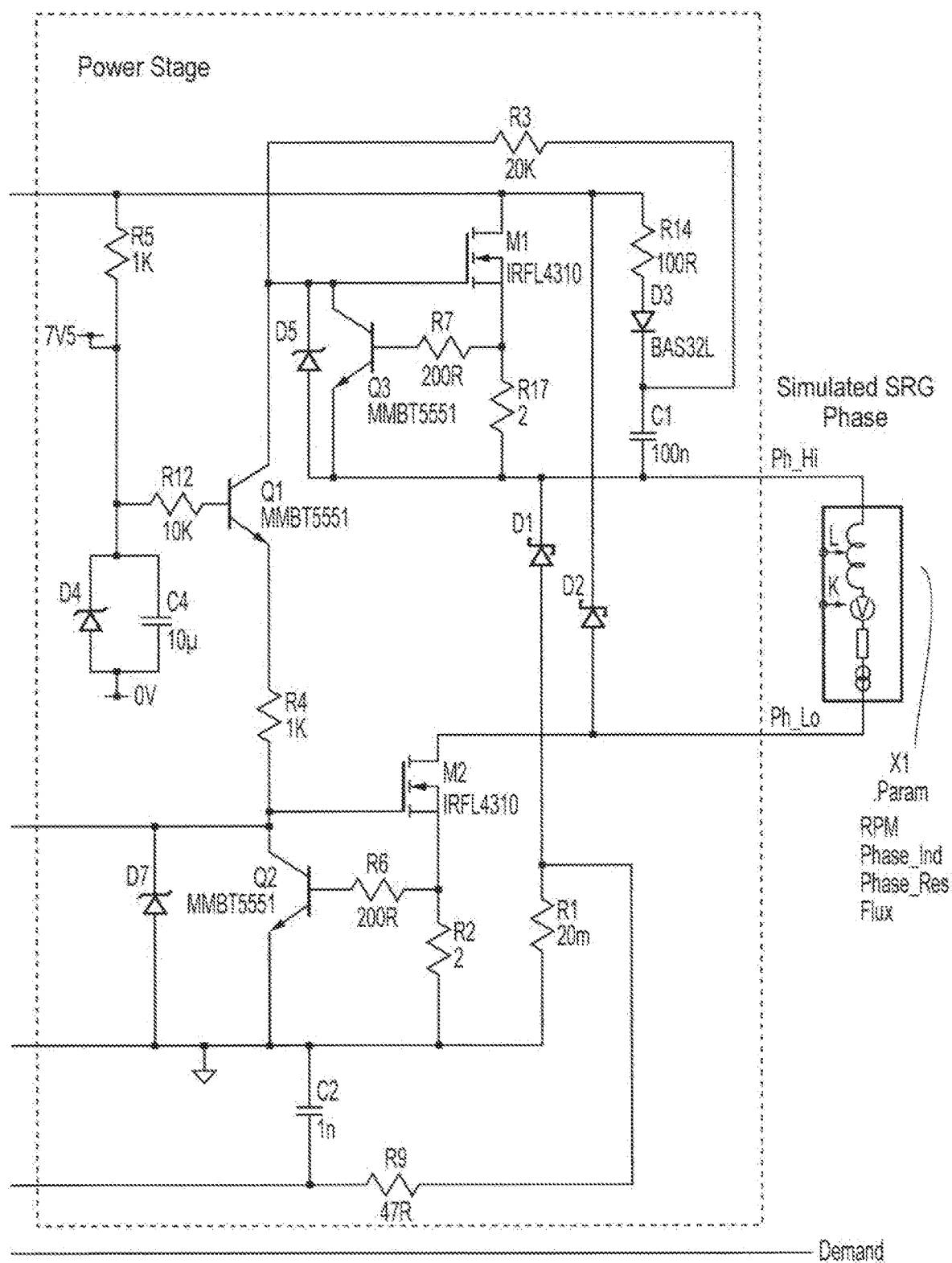

FIG. 10 shows a functional block diagram for a single phase drive of an SRG according to a further embodiment of the present invention in which a predictive timing control 202 is added which works in parallel with the threshold comparator to control the "self commutation" of the generator. FIG. 11 shows a schematic circuit diagram of the single phase drive with predictive timing control.

Figure 12:
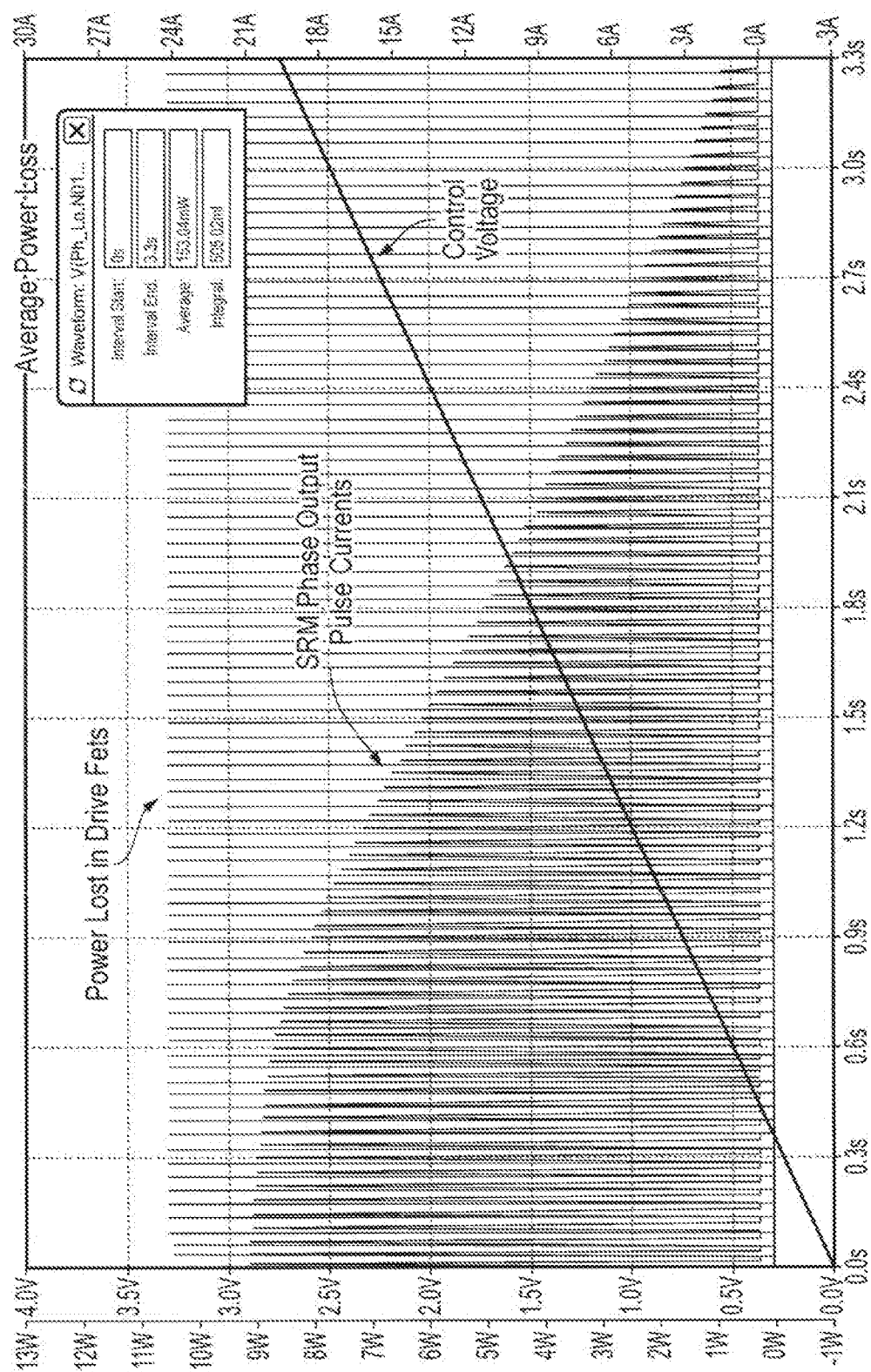
FIG. 12 shows the results of stimulation of the drive controller of FIGS. 10 and 11 with the predictive timing regulation in operation.

Once the predictive timing function is present it is possible, using the control input "Demand", shown in FIG. 11 to modulate the output current from the SRG. The result is that the "Self Commutation" feature of the SRG of this embodiment can now be used both to minimize power loss in the driver and to provide first order regulation of the SRG phase output current. This effect is shown in FIG. 12.

Whilst is it possible for an SRG to only have a single phase, multiple phase outputs are more normal; to configure a phase drive with predictive timing for such an application, one possibility is to simply treat each phase individually with a common demand input based on the state of the output voltage. However, in practice the balance of the machine output currents can be improved by using common "last cycle" timing data to produce an average value for the machine. This configuration is shown in FIG. 14 which shows a SRG according to an embodiment of the present invention having 4 stator poles 306 which have coils attached to separate control devices 307 and 6 rotor poles 305. Each phase drive controller X2 to X5 is an instantiation of the design shown in FIG. 11 but running from a common supply (generator 301) into a single load 302. The SRG is created from a set of independent phases with time shifting to represent the relative position of a six position rotor. The control devices 307 share a common "Demand" input and a common timing reference ("T_Ref").

Figure 13:
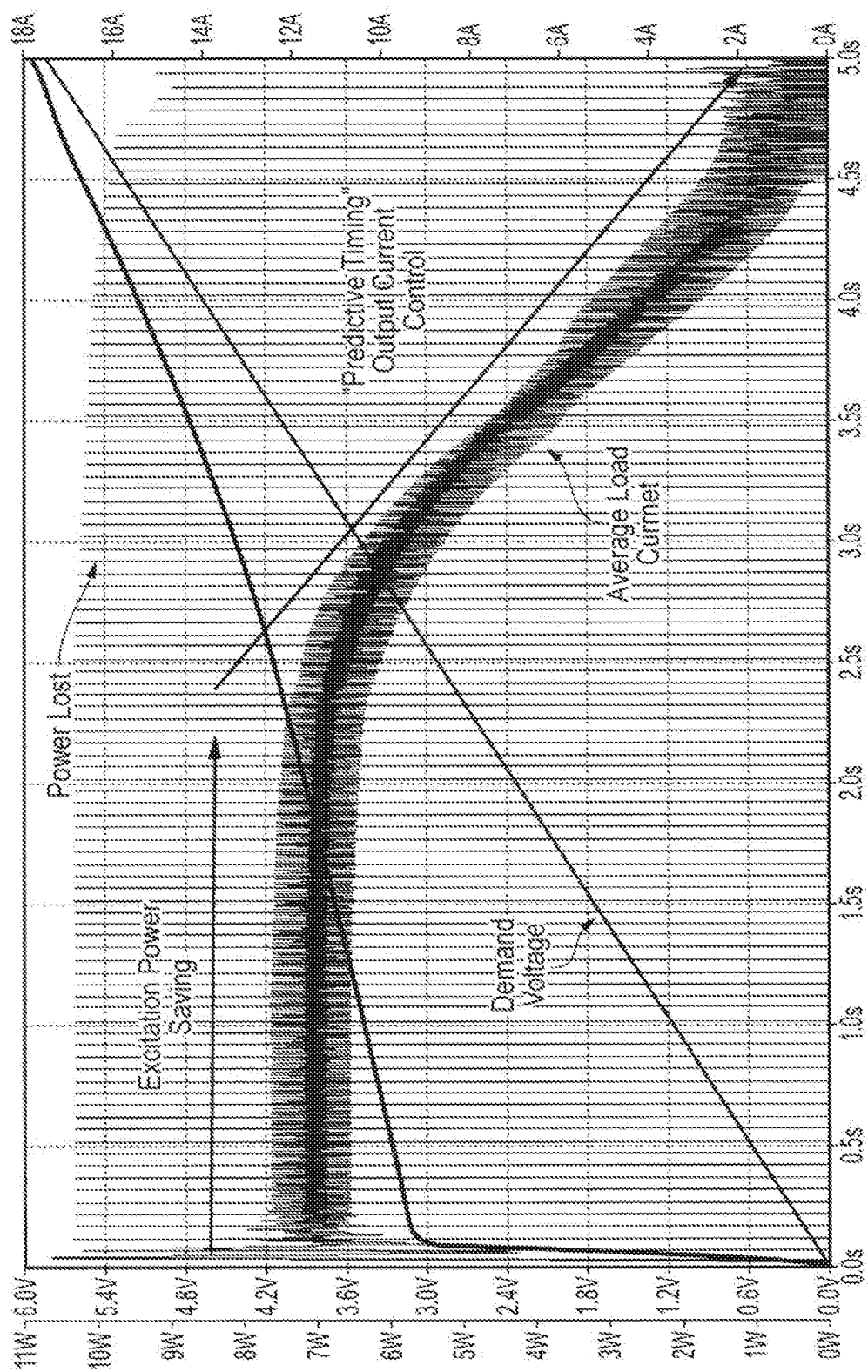
FIG. 13 shows the results of a simulation of the operation of a four phase generator according to a further embodiment of the present invention.
Figure 13:
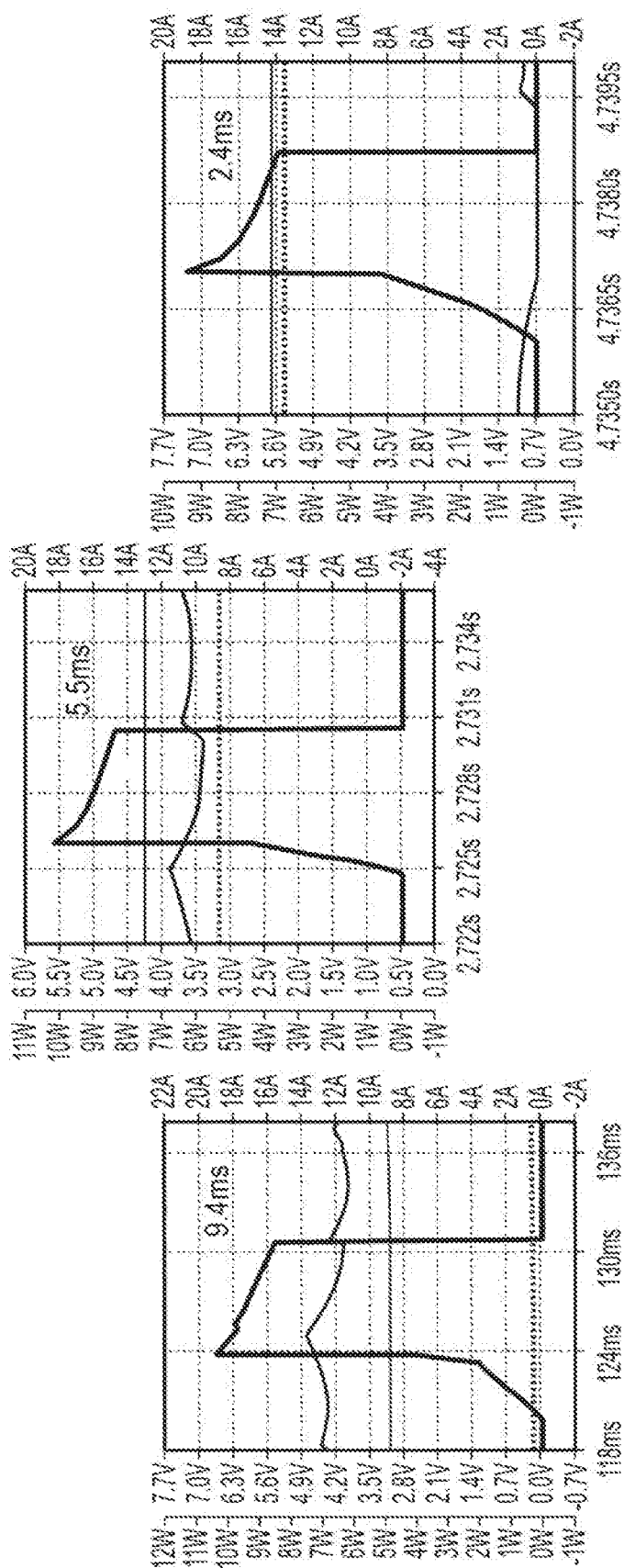

Simulation results for the four phase SRG of FIG. 14 are shown in FIG. 13, where the predictive timing element is modified by the demand voltage over a range that first improves the power lost to excitation and then reduces the peak output current of the phases, resulting in a controlled reduction in the average current flow in the load Id(M1).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

All references referred to above are hereby incorporated by reference.

The invention claimed is:

1. A method of controlling a switched reluctance generator, the generator including: (i) a rotor having a plurality of rotor poles, and (ii) a stator having a plurality of stator poles, wherein either the plurality of rotor poles or the plurality of stator poles each have windings to which a current is configured to be supplied to energize the respective plurality of rotor poles or the plurality of stator poles and from which current is configured to be drawn to a load, the method including steps of:
periodically and individually exciting each of the plurality of windings in sequential order to a pre-determined current value threshold, for each instant winding of the plurality of windings that is excited:
(i) measuring the current generated in the instantly excited winding of the plurality of windings;
(ii) terminating the excitation of the instant winding of the plurality of windings in response to the current generated in the instant winding exceeding the excitation current value threshold; and
(iii) supplying the generated current in the instant winding of the plurality of windings to the load; and
individually repeating steps (i)-(iii) for each sequential winding of the plurality of windings.

2. The method according to claim 1, wherein each of the plurality of windings is excited at a time when the plurality of windings are not generating current, or are generating current which is below a pre-determined level.

3. The method according to claim 1, wherein the generator outputs multiple phases to the load, and the multiple phases are supplied from different ones of the plurality of windings.

4. The method according to claim 1, further comprising the steps of:
storing a timing of the terminating of excitation of at least one winding in one cycle; and
using the stored timing to determine a timing of exciting at least one of the windings in a subsequent cycle.

5. The method according to claim 4, further comprising the step of regulating a power output from the generator by adjusting the timing of exciting each of the plurality of windings compared to the stored timings.

6. The method according to claim 1, further comprising the steps of, for each winding:
storing a timing of the terminating of excitation of the winding in one cycle; and
using the stored timing to determine a timing of exciting the winding in a subsequent cycle.

7. The method according to claim 1, further comprising the step of:
regulating the output from the generator to the load by modulating the current supplied from the windings by adjusting either an amplitude or a timing of the excitation of the windings.

8. The method according to claim 7, further comprising the step of regulating the output from the generator such that a minimum current flows through each winding.

9. The method according to claim 1, further comprising the steps of:
storing energy when the generator is not operational; and
using the stored energy to energize the windings when the generator is started.

10. A switched reluctance generator, the generator comprising:
a rotor having a plurality of rotor poles;
a stator having a plurality of stator poles, either the plurality of rotor poles or the plurality of stator poles each having a plurality of windings to which current is configured to be supplied to energize the respective plurality of rotor poles or plurality of stator poles and from which current is configured to be drawn to a load; and
a controller configured to:
periodically and individually excite each of the plurality of windings in sequential order to a pre-determined current value threshold, for each instant winding of the plurality of windings that is excited:
(i) measure the current generated in the instantly excited winding of the plurality of windings;
(ii) terminate the excitation of the instant winding of the plurality of windings in response to the current generated in the instant winding exceeding the excitation current value threshold; and
(iii) supply the generated current in the instant winding of the plurality of windings to the load; and
individually repeat steps (i)-(iii) for each sequential winding of the plurality of windings.

11. The generator according to claim 10, wherein the controller is configured to excite each of the windings at a time when the windings are not generating current, or are generating current which is below a pre-determined level.

12. The generator according to claim 10, wherein the generator is configured to (i) output multiple phases to the load, and (ii) supply the multiple phases from different ones of the plurality of windings.

13. The generator according to claim 10, further comprising at least one comparator configured to determine when the current generated in each winding exceeds the predetermined current value threshold.

14. The generator according to claim 10, wherein the controller is configured to:
store a timing of the terminating of the excitation of at least one winding in one cycle; and
use the stored timing to determine a timing of exciting at least one of the plurality of windings in a subsequent cycle.

15. The generator according to claim 14, wherein the controller is configured to regulate a power output from the generator by adjusting the timing of exciting the plurality of windings compared to the stored timings.

16. The generator according to claim 10, wherein the controller is configured to, for each winding:
store a timing of exciting each winding in one cycle; and
use the stored timing to determine a timing of exciting each winding in a subsequent cycle.

17. The generator according to claim 10, wherein the controller is configured to:
regulate the output from the generator to the load by modulating the current supplied from the plurality of windings by adjusting either an amplitude or a timing of the excitation of the plurality of windings.

18. The generator according to claim 17, wherein the controller is configured to regulate the output from the generator such that a minimum current flows through each winding.

19. The generator according to claim 10, further comprising an energy storage device configured to store energy used to energize the plurality of windings when the generator is started.

20. An engine comprising a switched reluctance generator, the generator including:

a rotor having a plurality of rotor poles;
a stator having a plurality of stator poles, either the plurality of rotor poles or the plurality of stator poles each having a plurality of windings to which current is configured to be supplied to energize the respective plurality of rotor poles or plurality of stator poles and from which current is configured to be drawn to a load; and
a controller configured to:
  periodically and individually excite each of the plurality of windings in sequential order to a pre-determined current value threshold, for each instant winding of the plurality of windings that is excited:
    (i) measure the current generated in the instantly excited winding of the plurality of windings;
    (ii) terminate the excitation of the instant winding of the plurality of windings in response to the current generated in the instant winding exceeding the excitation current value threshold; and
    (iii) supply the generated current in the instant winding of the plurality of windings to the load; and
  individually repeat steps (i)-(iii) for each sequential winding of the plurality of windings.

* * * * *